United States Patent
Li

(10) Patent No.: US 10,197,864 B2
(45) Date of Patent: Feb. 5, 2019

(54) RUBBING ROLLER AND RUBBING METHOD UTILIZING THE SAME FOR RUBBING ALIGNMENT LAYER OF LIQUID CRYSTAL DISPLAY SUBSTRATE, AND FABRICATING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Jian Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 55 days.

(21) Appl. No.: 15/533,739

(22) PCT Filed: Jun. 17, 2016

(86) PCT No.: PCT/CN2016/086238
§ 371 (c)(1),
(2) Date: Jun. 7, 2017

(87) PCT Pub. No.: WO2017/214978
PCT Pub. Date: Dec. 21, 2017

(65) Prior Publication Data
US 2018/0188611 A1    Jul. 5, 2018

(51) Int. Cl.
*G02F 1/1337*    (2006.01)
*G02F 1/136*    (2006.01)
(Continued)

(52) U.S. Cl.
CPC ...... *G02F 1/133784* (2013.01); *G02F 1/1303* (2013.01); *G02F 1/136* (2013.01); *G02F 1/1339* (2013.01); *G02F 1/133753* (2013.01)

(58) Field of Classification Search
CPC .. G02F 1/136; G02F 1/133784; G02F 1/1303; G02F 1/133753; G02F 1/1339
See application file for complete search history.

(56) References Cited

U.S. PATENT DOCUMENTS 5,568,296 A * 10/1996 Kodera ............. G02F 1/133784
264/340
6,219,123 B1 * 4/2001 Naito ................ G02F 1/133784
349/126
(Continued)

FOREIGN PATENT DOCUMENTS

CN    1224178 A    7/1999
CN    201864862 U    6/2011
(Continued)

OTHER PUBLICATIONS

International Search Report & Written Opinion dated Mar. 7, 2017 regarding PCT/CN2016/086238.
(Continued)

*Primary Examiner* — Nathanael R Briggs
(74) *Attorney, Agent, or Firm* — Intellectual Valley Law, P.C.

(57) ABSTRACT

The present application discloses a rubbing roller for rubbing an alignment layer of a liquid crystal display substrate, including a rotary roller and a rubbing cloth substantially surrounding a circumferential surface of the rotary roller. The rubbing cloth includes at least a first portion and a second portion, each having a width substantially corresponding to a length of the rotary roller and a length corresponding to a division of a circumference of the rotary roller. Substantially all fibers of the first portion extending
(Continued)

away from the rotary roller and leaning towards a first end of the rotary roller, and substantially all fibers of the second portion extending away from the rotary roller and leaning towards a second end of the rotary roller.

20 Claims, 6 Drawing Sheets

(51) Int. Cl.
    *G02F 1/1339* (2006.01)
    *G02F 1/13* (2006.01)

(56) References Cited

U.S. PATENT DOCUMENTS

2011/0292332 A1* 12/2011 Yang .................. G02F 1/133784
    349/187
2012/0099073 A1* 4/2012 Park .................. G02F 1/133784
    349/187

FOREIGN PATENT DOCUMENTS

| CN | 104216175 A | 12/2014 |
| JP | H06265901 A | 9/1994 |
| JP | H08146426 A | 6/1996 |
| JP | 2002006322 A | 1/2002 |
| KR | 20140078361 A | 6/2014 |

OTHER PUBLICATIONS

Investigation of the interaction between rubbing cloth and pattern structure on in-plane-switching liquid-crystal displays, Journal of the SID 18/1, 2010.

* cited by examiner

RUBBING ROLLER AND RUBBING METHOD UTILIZING THE SAME FOR RUBBING ALIGNMENT LAYER OF LIQUID CRYSTAL DISPLAY SUBSTRATE, AND FABRICATING METHOD THEREOF

CROSS-REFERENCE TO RELATED APPLICATION

This application is a national stage application under 35 U.S.C. § 371 of International Application No. PCT/CN2016/086238 filed Jun. 17, 2016, the contents of which are incorporated by reference in the entirety.

TECHNICAL FIELD

The present invention relates to display technology, more particularly, to a rubbing roller and a method utilizing the same for rubbing an alignment layer of a liquid crystal display substrate, and a fabricating method thereof.

BACKGROUND

A liquid crystal display device produces an image by applying an electric field to a liquid crystal layer between an array substrate and a package substrate (e.g. a color filter substrate). The electric field changes an alignment direction of the liquid crystal molecules in a liquid crystal layer. Light transmittance of the liquid crystal layer is adjusted when the alignment direction of the liquid crystal molecules changes. The liquid crystal molecules in a liquid crystal display device should be pre-aligned in a direction to normally operate the liquid crystal between two display substrates. Typically, a rubbing roller is used to align the liquid crystal molecules in a liquid crystal display device, i.e., by rubbing an alignment layer of a liquid crystal display substrate.

A conventional rubbing roller includes a rubbing cloth wrapped around a rotary roller. The rubbing cloth includes fibers on the surface of the rubbing cloth. When the rubbing roller is used to rub the alignment layer of the display substrate, fibers of the rubbing cloth are in contact with the alignment layer, which includes alignment polymers having a plurality of side chains. Fibers of the rubbing cloth form microgrooves in the alignment layer, aligning side chains of the alignment polymers in a direction along the microgroove. The liquid crystal molecules are arranged along the side chains of the alignment layer.

SUMMARY

In one aspect, the present invention provides a rubbing roller for rubbing an alignment layer of a liquid crystal display substrate, comprising a rotary roller and a rubbing cloth substantially surrounding a circumferential surface of the rotary roller; wherein the rubbing cloth comprises at least a first portion and a second portion, each having a width substantially corresponding to a length of the rotary roller and a length corresponding to a division of a circumference of the rotary roller; substantially all fibers of the first portion extending away from the rotary roller and leaning towards a first end of the rotary roller, and substantially all fibers of the second portion extending away from the rotary roller and leaning towards a second end of the rotary roller.

Optionally, each of the substantially all fibers of the first portion is inclined at a first inclined angle with respect to a first line perpendicular to a circumferential surface of the rotary roller and extending away from a first point where the each of the substantially all fibers of the first portion is in contact with the circumferential surface, respectively; each of the substantially all fibers of the second portion is inclined at a second inclined angle with respect to a second line perpendicular to the circumferential surface and extending away from a second point where the each of the substantially all fibers of the second portion is in contact with the circumferential surface, respectively; and the first inclined angle and the second inclined angle are in the range of approximately 1 degree to approximately 20 degree.

Optionally, the first inclined angle is substantially the same as the second inclined angle.

Optionally, the rubbing cloth consists essentially of the first portion and the second portion.

Optionally, the first portion and the second portion are spaced apart by two gaps.

Optionally, the first portion and the second portion has a substantially same thickness.

Optionally, a difference between a thickness of the first portion and a thickness of the second portion is no more than 0.1 mm.

Optionally, each of the first portion and the second portion has a length corresponding to approximately ⅓ to approximately ⅔ of the circumference of the rotary roller.

Optionally, each gap has a width substantially corresponding to the length of the rotary roller, a sum of lengths of the two gaps is in the range of approximately 1.5 mm to approximately 2.5 mm.

Optionally, each gap has a length in the range of approximately 0.5 mm to approximately 1.5 mm.

Optionally, the first portion and the second portion are made of a same material.

In another aspect, the present invention provides an alignment apparatus for rubbing an alignment layer of a liquid crystal display substrate comprising a rubbing roller described herein.

In another aspect, the present invention provides a method of fabricating a rubbing roller, comprising providing a rotary roller; providing at least a first rubbing cloth and a second rubbing cloth; securing the first rubbing cloth on a first region of a circumferential surface of the rotary roller, the first rubbing cloth having a width substantially corresponding to a length of the rotary roller and a length corresponding to a first division of a circumference of the rotary roller; substantially all fibers of the first rubbing cloth extending away from the rotary roller and leaning towards a first end of the rotary roller; securing the second rubbing cloth on a second region of the circumferential surface of the rotary roller, the second region and the first region being non-overlapping regions; the second rubbing cloth having a width substantially corresponding to the length of the rotary roller and a length corresponding to a second division of a circumference of the rotary roller; substantially all fibers of the second rubbing cloth extending away from the rotary roller and leaning towards a second end of the rotary roller; and the first direction and the second direction being on opposite sides with respect to a cross-section perpendicular to the length of the rotary roller.

Optionally, each of the substantially all fibers of the first rubbing cloth is inclined at a first inclined angle with respect to a first line perpendicular to a circumferential surface of the rotary roller and extending away from a first point where the each of the substantially all fibers of the first rubbing cloth is in contact with the circumferential surface, respectively; each of the substantially all fibers of the second rubbing cloth is inclined at a second inclined angle with respect to a second line perpendicular to the circumferential surface and extending away from a second point where the each of the substantially all fibers of the second rubbing cloth is in contact with the circumferential surface, respectively; and the first inclined angle and the second inclined angle are in the range of approximately 1 degree to approximately 20 degree.

Optionally, the first inclined angle is substantially the same as the second inclined angle.

Optionally, the first rubbing cloth and the second rubbing cloth are cut from a same rubber cloth.

In another aspect, the present invention provides a rubbing method for rubbing an alignment layer of a liquid crystal display substrate, comprising loading a liquid crystal display substrate having an alignment layer on a rubbing station; and rubbing a surface of the alignment layer for a plurality of rubbing cycles by rotating a single rubbing roller comprising a rotary roll and a rubbing cloth substantially surrounding a circumferential surface of the rotary roller, each rubbing cycle comprising at least two distinct rubbing periods, and the rubbing cloth comprising at least a first portion and a second portion; wherein the at least two distinct rubbing periods comprises a first period in which the alignment layer is rubbed by the first portion having substantially all fibers extending away from the rotary roller and leaning towards a first end of the rotary roller, and a second period in which the alignment layer is rubbed by the second portion having substantially all fibers extending away from the rotary roller and leaning towards a second end of the rotary roller; the second period being later in time than the first period.

Optionally, each of the substantially all fibers of the first portion is inclined at a first inclined angle with respect to a first line perpendicular to a circumferential surface of the rotary roller and extending away from a first point where the each of the substantially all fibers of the first portion is in contact with the circumferential surface, respectively, each of the substantially all fibers of the second portion is inclined at a second inclined angle with respect to a second line perpendicular to the circumferential surface and extending away from a second point where the each of the substantially all fibers of the second portion is in contact with the circumferential surface, respectively, the first inclined angle and the second inclined angle are in the range of approximately 1 degree to approximately 20 degree.

Optionally, the first inclined angle is substantially the same as the second inclined angle.

Optionally, the rubbing method further includes providing the single rubbing roller; wherein the rubbing cloth comprises at least a first portion and a second portion, each having a width substantially corresponding to a length of the rotary roller and a length corresponding to a division of a circumference of the rotary roller; and substantially all fibers of the first portion extending away from the rotary roller and leaning towards a first end of the rotary roller, and substantially all fibers of the second portion extending away from the rotary roller and leaning towards a second end of the rotary roller.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

To achieve a wide viewing angle, liquid crystal display panel may include two-domain or multi-domain pixels, i.e., two domains or multiple domains are formed in each pixel. Liquid crystal molecules are to be aligned to tilt along different directions in the two domains or multiple domains of each pixel. When a domain is tilted in a substantially the same direction as the fibers of the rubbing cloth, the rubbing process may be normally performed. However, when a domain is tilted in a direction different from that of the fibers of the rubbing cloth, the rubbing process may not be normally performed, and the liquid crystal molecules may not align well, resulting in display defects.

Moreover, patterns having a large height difference on the substrate also interfere with the fibers of the rubbing cloth during the rubbing process. For example, data pad typically forms a large height difference on the array substrate, often resulting in an abnormally performed rubbing process. Two sides of the data pad (e.g., a first side proximal to an integrated circuit board and a second side distal to the integrated circuit board) are rubbed differently. For example, depending on the inclined angle of the rubbing cloth fibers, image display on the second side may not be normally black. The image display may be too black when rubbed by a rubbing cloth having fibers of a first inclined angle, and may be too bright when rubbed by a rubbing cloth having fibers of a second inclined angle.

Similarly, pattern spacers on the color filter substrate typically have a large height difference, interfering with the rubbing process. The alignment layer proximal to pattern spacers may not be sufficiently rubbed, resulting in light leakage in the area.

In the present disclosure, it is discovered that disadvantages associated with the conventional rubbing roller and rubbing method may be overcome by using a rubbing roller having a rubbing cloth including at least a first portion and a second portion. Fibers of the first portion incline in a direction different from that of fibers of the second portion. By using the present rubbing roller and rubbing method, an alignment layer of each domain of an array substrate may be sufficiently rubbed. Interference on the rubbing process due to large height differences of various patterns (e.g., data pad, pattern space, etc.) may be eliminated. Light leakage surrounding the pattern spacers may be reduced.

Figure 1A:
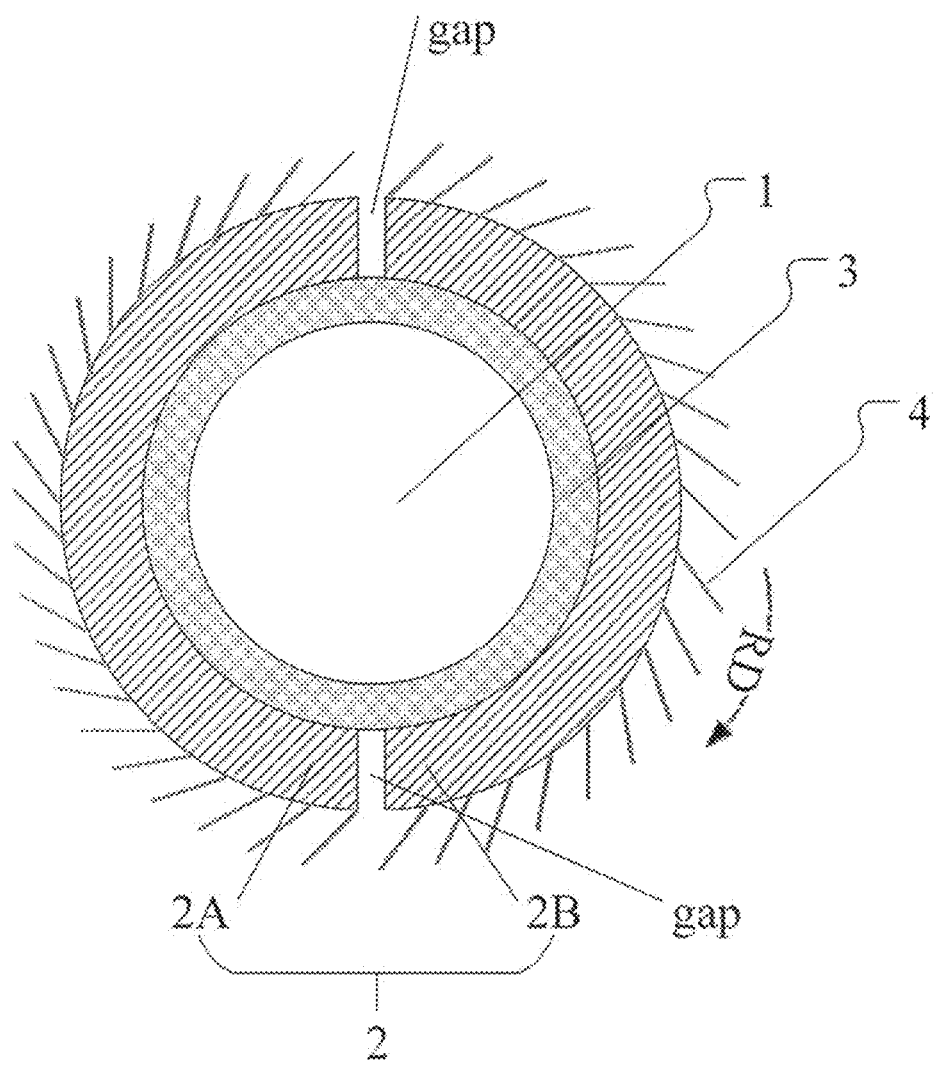
FIG. 1A is a side view of the rubbing roller for rubbing an alignment layer of a liquid crystal display substrate in some embodiments.

FIG. 1A is a side view of the rubbing roller for rubbing an alignment layer of a liquid crystal display substrate in some embodiments. Referring to FIG. 1A, the rubbing roller in the embodiment includes a rotary roller 1, a rubbing cloth 2, and an adhesive layer 3 (e.g., a double-side adhesive tape) adhering the rubbing cloth 2 onto the rotary roller 1. The rubbing cloth 2 is disposed substantially surrounding the circumferential surface of the rotary roller 1, except two small gaps between a first portion 2A and a second portion 2B of the rubbing cloth 2. Each of the first portion 2A and the second portion 2B has a plurality of fibers on its surface.

Figure 1B:
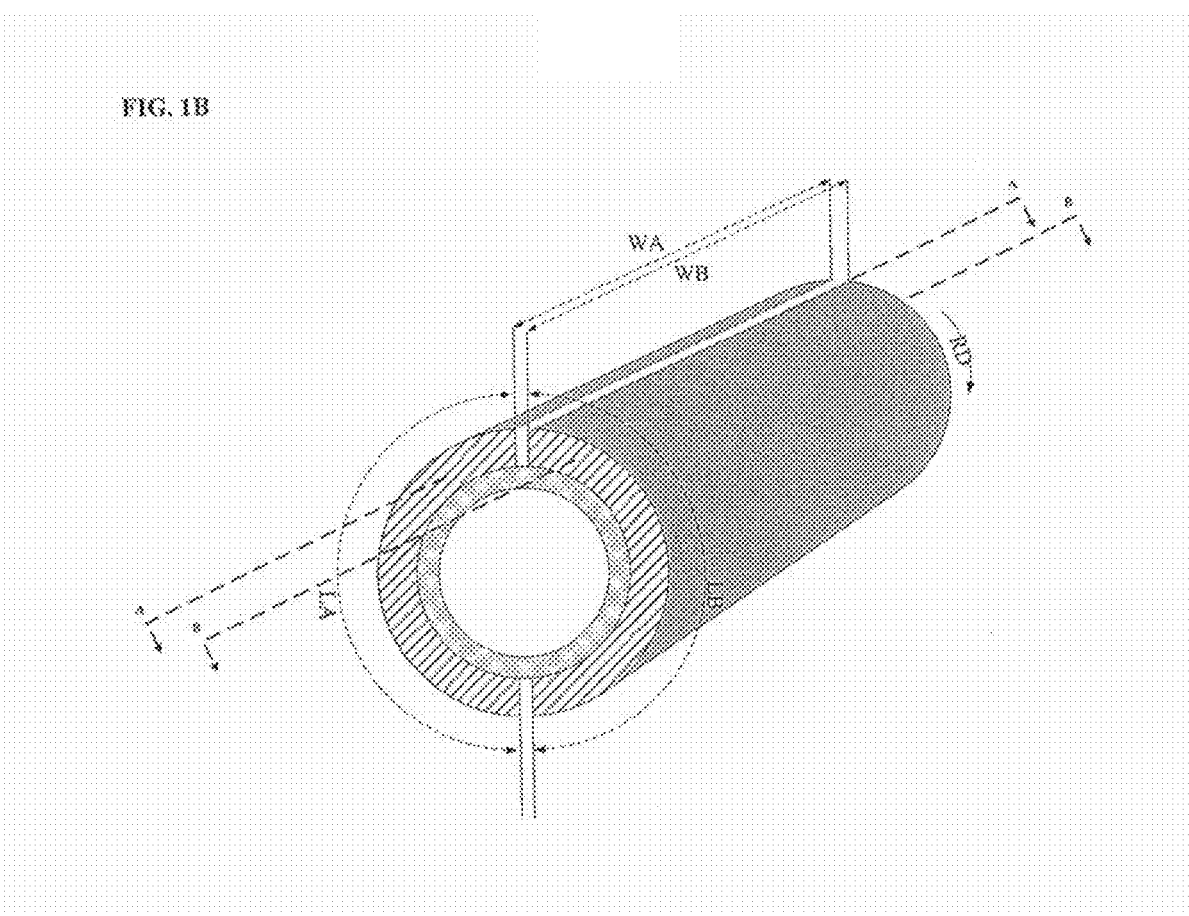
FIG. 1B is a perspective view of the rubbing roller for rubbing an alignment layer of a liquid crystal display substrate in some embodiments.

FIG. 1B is a perspective view of the rubbing roller for rubbing an alignment layer of a liquid crystal display substrate in some embodiments (fibers are not shown in the figure). Referring to FIG. 1B, the first portion 2A has a width WA substantially corresponding to a length of the rotary roller, and the second portion 2B has a width WB substantially corresponding to a length of the rotary roller. As shown in FIG. 1B, the first portion 2A has a length substantially corresponding to a division of a circumference of the rotary roller, e.g., approximately one half of the circumference of the rotary roller. Similarly, the second portion 2B has a length substantially corresponding to a division of a circumference of the rotary roller, e.g., approximately one half of the circumference of the rotary roller.

In some embodiments, the rubbing cloth includes more than two portions, e.g., 3, 4, 5, or 6 portions. For example, each portion may have a width substantially corresponding to a length of the rotary roller and a length corresponding to a division of a circumference of the rotary roller. The ends of two adjacent portions may be in contact with each other (but not overlapping). Alternatively, two adjacent portions may be spaced apart by a small gap to avoid overlapping of rubbing cloth. Optionally, the rubbing cloth include only two portions, e.g., the first portion and the second portion as shown in FIG. 1A and FIG. 1B.

In some embodiments, a sum of lengths of the gaps is in the range of approximately 1.5 mm to approximately 2.5 mm, e.g., approximately 1.5 mm to approximately 2.0 mm or approximately 2.0 mm to approximately 2.5 mm. In some embodiments, each gap has a length in the range of approximately 0.5 mm to approximately 1.5 mm, e.g., approximately 0.5 mm to approximately 1.0 mm, or approximately 1.0 mm to approximately 1.5 mm. Optionally, the rubbing cloth includes two portions spaced apart by two gaps. Optionally, the rubbing cloth includes a plurality of portions (e.g., more than two portions) spaced apart by a plurality of gaps (e.g., more than two gaps).

Figure 2A:
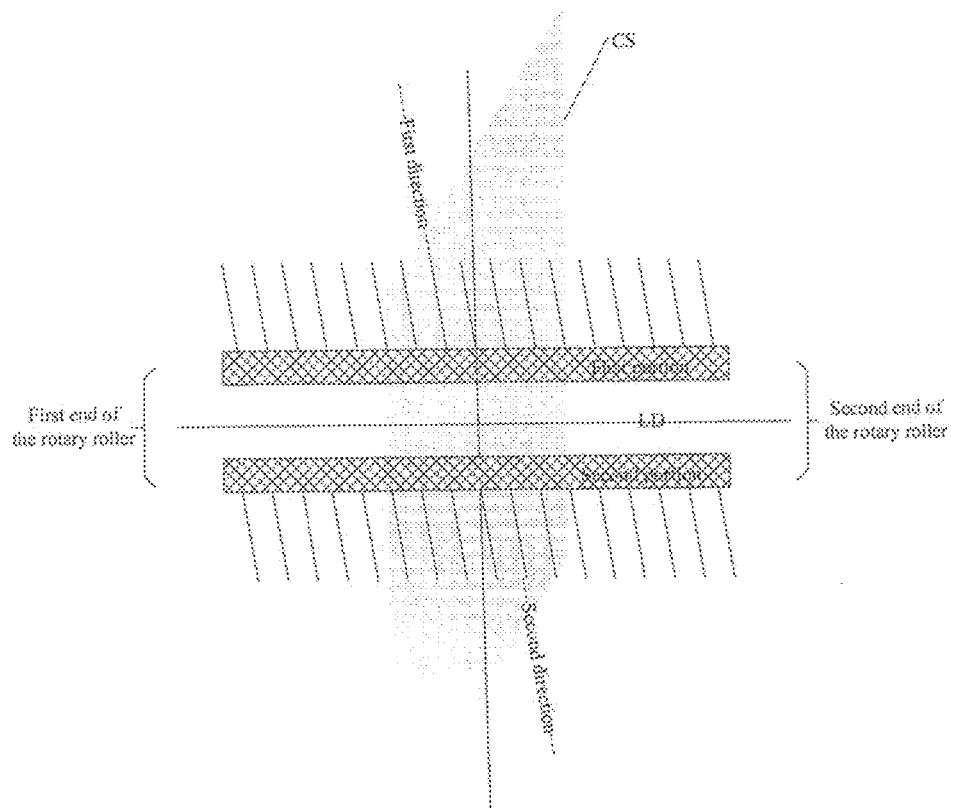
FIG. 2A is a cross-sectional view of the rubbing roller along the length direction of the rubbing roller in some embodiments.

FIG. 2A is a cross-sectional view of the rubbing roller along the length direction of the rubbing roller in some embodiments. Referring to FIG. 2A, substantially all fibers of the first portion extend away from and lean towards a first end of the rotary roller, and substantially all fibers of the second portion extend away from and lean towards a second end of the rotary roller. The first end and the second end of the rotary roller refers to two ends along the length direction of the rotary roller, e.g., two ends of a rotation shaft of the rubbing roller. In some embodiments, substantially all fibers of the first portion are inclined in a first direction with respect to a cross-section CS perpendicular to the length of the rotary roller LD, and substantially all fibers of the second portion are inclined in a second direction with respect to the cross-section CS perpendicular to the length of the rotary roller LD. The first direction and the second direction are on opposite sides with respect to the cross-section.

Figure 2B:
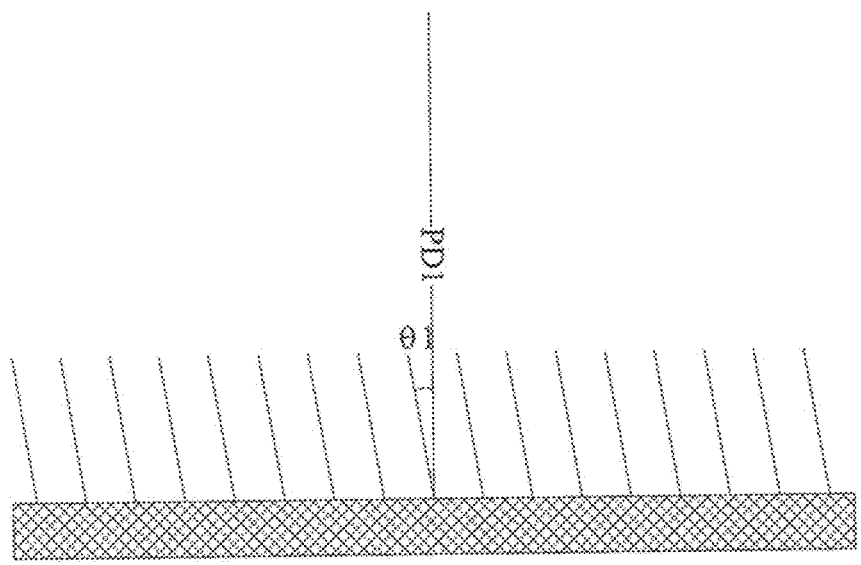
FIG. 2B is a cross-sectional view of the first portion along A-A' line in FIG. 1B.

FIG. 2B is a cross-sectional view of the first portion along A-A' line in FIG. 1B. Referring to FIG. 2B and FIG. 1B, substantially all fibers on the first portion incline substantially in a first direction with respect to the cross-section perpendicular to the length of the rotary roller, i.e., substantially all fibers of the first portion extend away from and lean towards a first end of the rotary roller. Each of the substantially all fibers of the first portion is inclined at a first inclined angle $\theta 1$ with respect to a first line PD1 perpendicular to a circumferential surface of the rotary roller and extending away from a first point where the each of the substantially all fibers of the first portion is in contact with the circumferential surface, respectively. Optionally, $\theta 1$ is an angle in the range of approximately 1 degree to approximately 45 degree, e.g., approximately 5 degree to approximately 40 degree, approximately 5 degree to approximately 35 degree, approximately 5 degree to approximately 30 degree, approximately 5 degree to approximately 25 degree, approximately 5 degree to approximately 20 degree, approximately 1 degree to approximately 20 degree, or approximately 5 degree to approximately 15 degree.

Figure 2C:
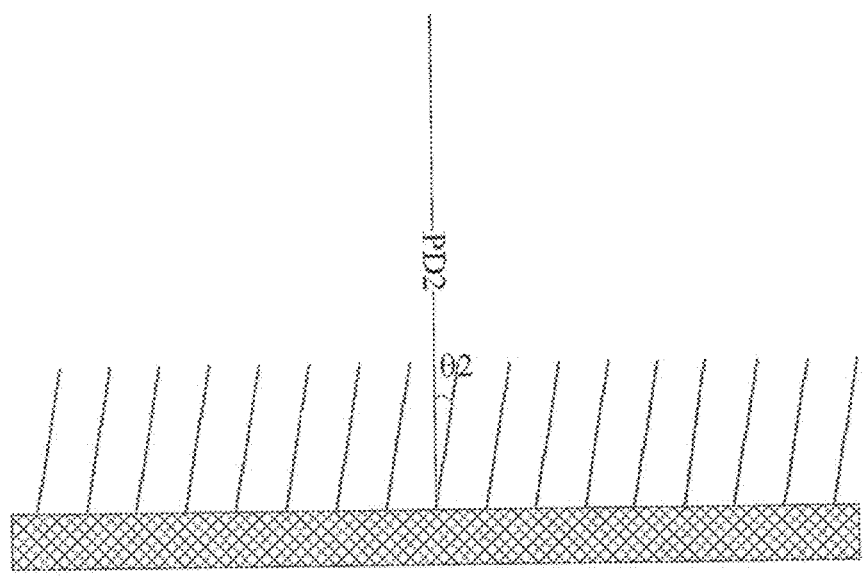
FIG. 2C is a cross-sectional view of the second portion along B-B' line in FIG. 1B.

FIG. 2C is a cross-sectional view of the second portion along B-B' line in FIG. 1B. Referring to FIG. 2C and FIG. 1B, substantially all fibers on the second portion incline substantially in a second direction with respect to the cross-section perpendicular to the length of the rotary roller, i.e., substantially all fibers of the second portion extend away from and lean towards a second end of the rotary roller. Each of the substantially all fibers of the second portion is inclined at a second inclined angle $\theta 2$ with respect to a second line PD2 perpendicular to the circumferential surface and extending away from a second point where the each of the substantially all fibers of the second portion is in contact with the circumferential surface, respectively. Optionally, $\theta 2$ is an angle in the range of approximately 1 degree to approximately 45 degree, e.g., approximately 5 degree to approximately 40 degree, approximately 5 degree to approximately 35 degree, approximately 5 degree to approximately 30 degree, approximately 5 degree to approximately 25 degree, approximately 5 degree to approximately 20 degree, approximately 1 degree to approximately 20 degree, or approximately 5 degree to approximately 15 degree.

Figure 2D:
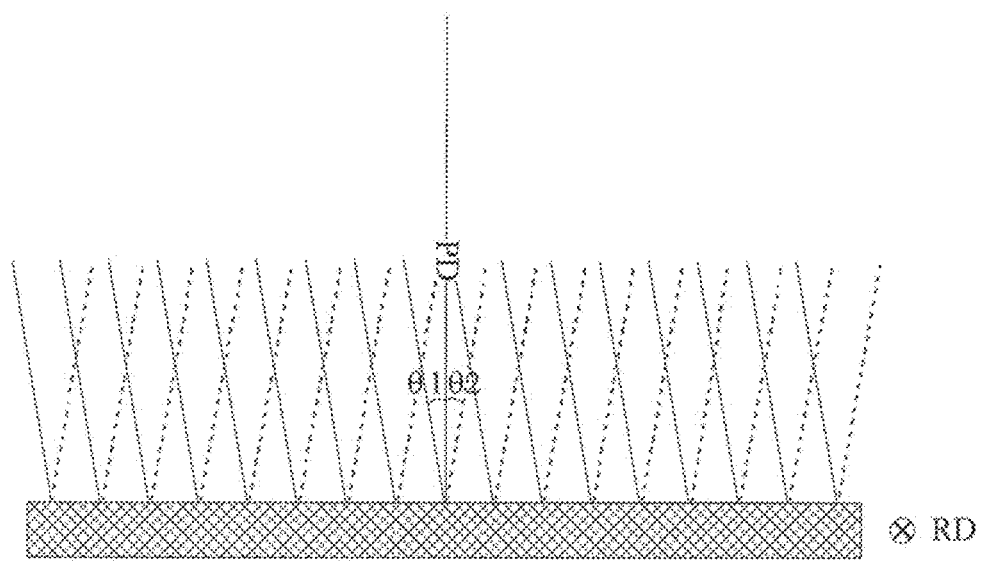
FIG. 2D is a superimposition of FIG. 2B and FIG. 2C.

FIG. 2D is a superimposition of FIG. 2B and FIG. 2C. Referring to FIG. 2D, when viewed along a rotating direction RD of the rotary roller, the fibers of the first portion and the fibers of the second direction are on opposite sides with respect to a direction PD perpendicular to the circumferential surface of the rotary roller (e.g., in cross-sectional view of the circumferential surface of the rotary roller).

Optionally, $\theta 1$ and $\theta 2$ are the same. Optionally, $\theta 1$ and $\theta 2$ are different angles. Optionally, all fibers in the first portion exclusively incline in the first direction with respect to cross-section perpendicular to the length of the rotary roller, and all fibers in the second portion exclusively incline in the second direction with respect to the cross-section perpendicular to the length of the rotary roller. The first portion and the second portion may have substantially the same thickness as shown in FIG. 2D. Optionally, the first portion and the second portion have different thicknesses. For example, the thickness of the first portion differs from that of the second portion by no more than 0.2 mm, e.g., no more than 0.1 mm, or no more than 0.05 mm. As used herein, the thickness of a rubbing cloth includes the thickness of a layer of fibers of the rubbing cloth.

In some embodiments, fibers of the first portion and the second portion are inclined in a same direction as the rotating direction of the rotary roller (see, e.g., FIG. 1). In some embodiments, fibers of the first portion and the second portion are inclined in a direction opposite to the rotating direction of the rotary roller.

Various appropriate materials may be used for making the rubbing cloth and the fiber thereof. Examples of rubbing cloth materials and fiber materials include, but are not limited to, short fiber materials such as cotton, and long fiber materials such as nylon and Rayon. The first portion and the second portion (including the fibers thereof) may be made of a same material. Optionally, the first portion and the second portion (including the fibers thereof) are made of different materials.

Accordingly, the present disclosure provides a method of fabricating a rubbing roller. In some embodiments, the method includes providing a rotary roller; providing at least a first rubbing cloth and a second rubbing cloth. The method further involves securing the first rubbing cloth on a first region of a circumferential surface of the rotary roller, and securing the second rubbing cloth on a second region of the circumferential surface of the rotary roller. The second region and the first region are non-overlapping regions of the rotary roller. Each of the first rubbing cloth and the second rubbing cloth has a width substantially corresponding to a length of the rotary roller and a length corresponding to a division of a circumference of the rotary roller, e.g., a first division corresponding to the first rubbing cloth, and a second division corresponding to the second rubbing cloth. When the first rubbing cloth and the second rubbing cloth are secured to the rotary roller, substantially all fibers of the first rubbing cloth extend away from and lean towards a first end of the rotary roller, and substantially all fibers of the second rubbing cloth extend away from and lean towards a second end of the rotary roller. In some embodiments, substantially all fibers of the first rubbing cloth incline in a first direction with respect to a cross-section perpendicular to the length of the rotary roller, and substantially all fibers of the second rubbing cloth incline in a second direction with respect to the cross-section perpendicular to the length of the rotary roller. The first direction and the second direction being on opposite sides with respect to the cross-section. When viewed along a rotating direction of the rotary roller, the first direction and the second direction are on opposite sides with respect to the direction perpendicular to the circumferential surface of the rotary roller (e.g., in cross-sectional view of the circumferential surface of the rotary roller).

Various appropriate methods may be practiced to secure the rubbing cloth on the circumferential surface of the rotary roller. For example, the rubbing cloth may be adhered onto the circumferential surface of the rotary roller, e.g., by an adhesive such as a double-sided adhesive tape.

In some embodiments, the method includes providing more than two rubbing clothes, e.g., 3, 4, 5, or 6 rubbing clothes. Each rubbing cloth may have a width substantially corresponding to a length of the rotary roller and a length corresponding to a division of a circumference of the rotary roller. The plurality of rubbing clothes may be secured to the circumferential surface of the rotary roller so that the ends of two adjacent rubbing clothes are in contact with each other (but not overlapping). Alternatively, the plurality of rubbing clothes may be secured to the circumferential surface of the rotary roller so that two adjacent rubbing clothes may be spaced apart by a small gap to avoid overlapping of rubbing cloth. Optionally, the method includes providing only two rubbing clothes, e.g., the first rubbing cloth and the second rubbing cloth.

In some embodiments, a sum of lengths of the gaps is in the range of approximately 1.5 mm to approximately 2.5 mm, e.g., approximately 1.5 mm to approximately 2.0 mm or approximately 2.0 mm to approximately 2.5 mm. In some embodiments, each gap has a length in the range of approximately 0.5 mm to approximately 1.5 mm, e.g., approximately 0.5 mm to approximately 1.0 mm, or approximately 1.0 mm to approximately 1.5 mm. Optionally, the rubbing cloth includes two portions spaced apart by two gaps. Optionally, the rubbing cloth includes a plurality of portions (e.g., more than two portions) spaced apart by a plurality of gaps (e.g., more than two gaps).

Fibers of the rubbing clothes may have an inclined angle θ in the range of approximately 1 degree to approximately 45 degree, e.g., approximately 5 degree to approximately 40 degree, approximately 5 degree to approximately 35 degree, approximately 5 degree to approximately 30 degree, approximately 5 degree to approximately 25 degree, approximately 5 degree to approximately 20 degree, approximately 1 degree to approximately 20 degree, or approximately 5 degree to approximately 15 degree.

In some embodiments, each of the substantially all fibers of the first rubbing cloth is inclined at a first inclined angle θ1 with respect to a first line perpendicular to a circumferential surface of the rotary roller and extending away from a first point where the each of the substantially all fibers of the first rubbing cloth is in contact with the circumferential surface, respectively. In some embodiments, each of the substantially all fibers of the second rubbing cloth is inclined at a second inclined angle θ2 with respect to a second line perpendicular to the circumferential surface and extending away from a second point where the each of the substantially all fibers of the second rubbing cloth is in contact with the circumferential surface, respectively. Optionally, the first inclined angle θ1 and the second inclined angle θ2 are in the range of approximately 1 degree to approximately 20 degree.

Fibers of the first rubbing cloth has a first inclined angle of θ1, fibers of the second rubbing cloth has a second inclined angle of θ2. Optionally, θ1 and θ2 are the same. Optionally, θ1 and θ2 are different angles. Optionally, all fibers in the first rubbing cloth exclusively incline in the first direction with respect to the direction perpendicular to the circumferential surface of the rotary roller, and all fibers in the second rubbing cloth exclusively incline in the second direction with respect to the direction perpendicular to the circumferential surface of the rotary roller.

In some embodiments, the method includes providing more than two rubbing clothes. Fibers of an additional rubbing cloth may have an inclined angle of θn, which may be the same or different from θ1 and θ2. Optionally, fibers of the additional rubbing cloth may be inclined substantially in a first direction with respect to a direction perpendicular to the circumferential surface of the rotary roller. Optionally, fibers of the additional rubbing cloth may be inclined substantially in a second direction with respect to a direction perpendicular to the circumferential surface of the rotary roller. Optionally, the more than two rubbing clothes include a third rubbing cloth and a fourth rubbing cloth. Fibers of the third rubbing cloth has a third inclined angle of θ3, fibers of the fourth rubbing cloth has a fourth inclined angle of θ4. Optionally, fibers of the third rubbing cloth incline substantially in the first direction with respect to a direction perpendicular to the circumferential surface of the rotary roller, and fibers of the fourth rubbing cloth incline substantially in the second direction with respect to a direction perpendicular to the circumferential surface of the rotary roller.

In some embodiments, all rubbing clothes have a substantially the same thickness. In some embodiments, the thicknesses of all rubbing clothes differ from each other by no more than 0.2 mm, e.g., no more than 0.1 mm, or no more than 0.05 mm.

Figure 3:
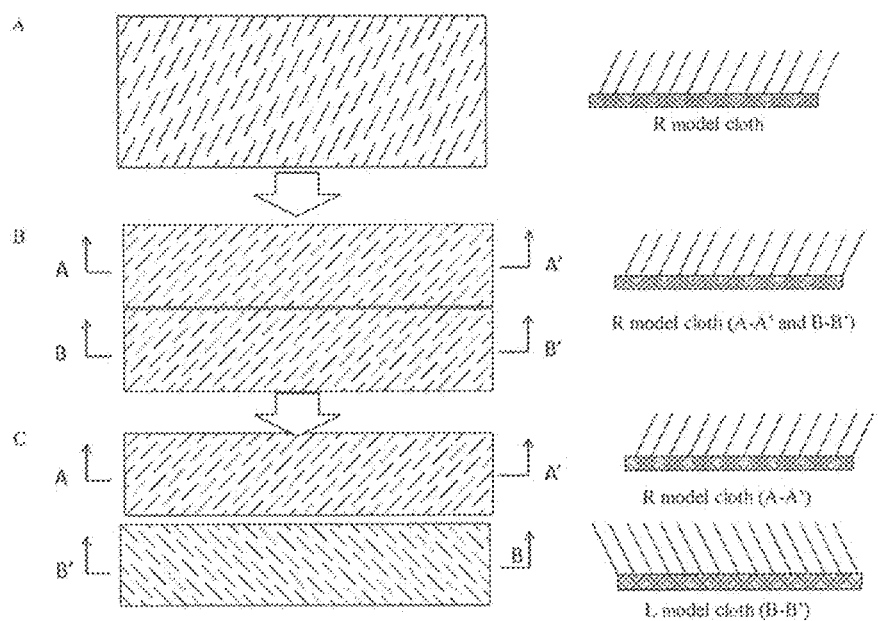
FIG. 3 is a diagram illustrating a process of fabricating a rubbing roller in some embodiments.

FIG. 3 is a diagram illustrating a process of fabricating a rubbing roller in some embodiments. The process is illustrated in plan view of the rubbing cloth on the left side of FIG. 3, and is illustrated in cross-sectional view of the rubbing cloth on the right side of FIG. 3 (e.g., along A-A' line or B-B' line). Referring to FIG. 3A, an initial rubbing cloth having fibers inclined towards a right side with respect to the direction perpendicular to the surface of the rubbing cloth is provided (see "R model cloth" in FIG. 3A). The initial rubbing cloth may be cut in half to obtain a first rubbing cloth and a second rubbing cloth (FIG. 3B). At this stage, fibers of both the first rubbing cloth and the second rubbing cloth are inclined towards the right side with respect to the direction perpendicular to the surface of the rubbing cloth (see "R model cloth (A-A' and B-B')" in FIG. 3B). Subsequently, the second rubbing cloth is rotated 180 degrees relative to the direction perpendicular to the surface of the rubbing cloth (FIG. 3C), as such fibers of the second rubbing cloth are inclined towards a left side with respect to the direction perpendicular to the surface of the rubbing cloth (see "L model cloth (B-B')" in FIG. 3C).

Once the first rubbing cloth (the "R model cloth") and the second rubbing cloth (the "L model cloth") are prepared, they are secured on a first region and a second region of the circumferential surface of the rotary roller, respectively. Fibers of the first rubbing cloth are inclined substantially in a "right" direction with respect to the direction perpendicular to the circumferential surface of the rotary roller, and fibers of the second rubbing cloth are inclined substantially in a "left" direction with respect to the direction perpendicular to the circumferential surface of the rotary roller.

In another aspect, the present disclosure provides a rubbing method for rubbing an alignment layer of a liquid crystal display substrate. In some embodiments, the rubbing method includes loading a liquid crystal display substrate having an alignment layer on a rubbing station; and rubbing a surface of the alignment layer for a plurality of rubbing cycles by rotating a single rubbing roller comprising a rotary roll and a rubbing cloth substantially surrounding a circumferential surface of the rotary roller. Each rubbing cycle includes at least two distinct rubbing periods. The rubbing cloth includes at least a first portion and a second portion.

In some embodiments, the at least two distinct rubbing periods include the first period in which the alignment layer is rubbed by the first portion having substantially all fibers extending away from the rotary roller and leaning towards a first end of the rotary roller, and a second period in which the alignment layer is rubbed by the second portion having substantially all fibers extending away from the rotary roller and leaning towards a second end of the rotary roller. In some embodiments, the at least two distinct rubbing periods include the first period in which the alignment layer is rubbed by the first portion having substantially all fibers inclined in a first direction with respect to a cross-section perpendicular to the length of the rotary roller, and the second period in which the alignment layer is rubbed by the second portion having substantially all fibers inclined in a second direction with respect to a cross-section perpendicular to the length of the rotary roller, the first direction and the second direction being on opposite sides with respect to the cross-section. The second period is later in time than the first period.

In some embodiments, each of the substantially all fibers of the first portion is inclined at a first inclined angle $\theta 1$ with respect to a first line perpendicular to a circumferential surface of the rotary roller and extending away from a first point where the each of the substantially all fibers of the first portion is in contact with the circumferential surface, respectively. In some embodiments, each of the substantially all fibers of the second portion is inclined at a second inclined angle $\theta 2$ with respect to a second line perpendicular to the circumferential surface and extending away from a second point where the each of the substantially all fibers of the second portion is in contact with the circumferential surface, respectively. Optionally, the first inclined angle $\theta 1$ and the second inclined angle $\theta 2$ are in the range of approximately 1 degree to approximately 20 degree.

Optionally, the rubbing cycles result in a continuous rubbing process in which there is no interval between rubbing periods and between rubbing cycles. Optionally, the rubbing process includes a short interval between rubbing periods and between rubbing cycles.

Optionally, the method further includes providing a single rubbing roller having at least a first portion and a second portion as described herein throughout.

In another aspect, the present disclosure provides an alignment apparatus for rubbing an alignment layer of a liquid crystal display substrate. In some embodiments, the alignment apparatus includes a rubbing roller described herein or fabricating by a method described herein. The alignment apparatus may further include a rubbing station for placing a liquid crystal display substrate and a motor for driving the rubbing roller.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A rubbing roller for rubbing an alignment layer of a liquid crystal display substrate, comprising a rotary roller and a rubbing cloth substantially surrounding a circumferential surface of the rotary roller; wherein the rubbing cloth comprises at least a first portion and a second portion, each having a width substantially corresponding to a length of the rotary roller and a length corresponding to a division of a circumference of the rotary roller;
   substantially all fibers of the first portion extending away from the rotary roller and leaning towards a first end of the rotary roller, and substantially all fibers of the second portion extending away from the rotary roller and leaning towards a second end of the rotary roller.

2. The rubbing roller of claim 1, wherein
   each of the substantially all fibers of the first portion is inclined at a first inclined angle with respect to a first line perpendicular to a circumferential surface of the rotary roller and extending away from a first point where the each of the substantially all fibers of the first portion is in contact with the circumferential surface, respectively;
   each of the substantially all fibers of the second portion is inclined at a second inclined angle with respect to a second line perpendicular to the circumferential surface and extending away from a second point where the each of the substantially all fibers of the second portion is in contact with the circumferential surface, respectively; and
   the first inclined angle and the second inclined angle are in the range of approximately 1 degree to approximately 20 degree.

3. The rubbing roller of claim 2, wherein the first inclined angle is substantially the same as the second inclined angle.

4. The rubbing roller of claim 3, wherein the rubbing cloth consists essentially of the first portion and the second portion.

5. The rubbing roller of claim 4, wherein the first portion and the second portion are spaced apart by two gaps.

6. The rubbing roller of claim 5, wherein the first portion and the second portion has a substantially same thickness.

7. The rubbing roller of claim 6, wherein a difference between a thickness of the first portion and a thickness of the second portion is no more than 0.1 mm.

8. The rubbing roller of claim 5, wherein each of the first portion and the second portion has a length corresponding to approximately ⅓ to approximately ⅔ of the circumference of the rotary roller.

9. The rubbing roller of claim 8, wherein each gap has a width substantially corresponding to the length of the rotary roller, a sum of lengths of the two gaps is in the range of approximately 1.5 mm to approximately 2.5 mm.

10. The rubbing roller of claim 9, wherein each gap has a length in the range of approximately 0.5 mm to approximately 1.5 mm.

11. The rubbing roller of claim 1, wherein the first portion and the second portion are made of a same material.

12. An alignment apparatus for rubbing an alignment layer of a liquid crystal display substrate comprising a rubbing roller of claim 1.

13. A method of fabricating a rubbing roller, comprising:
    providing a rotary roller;
    providing at least a first rubbing cloth and a second rubbing cloth;
    securing the first rubbing cloth on a first region of a circumferential surface of the rotary roller, the first rubbing cloth having a width substantially corresponding to a length of the rotary roller and a length corresponding to a first division of a circumference of the rotary roller; substantially all fibers of the first rubbing cloth extending away from the rotary roller and leaning towards a first end of the rotary roller;
    securing the second rubbing cloth on a second region of the circumferential surface of the rotary roller, the second region and the first region being non-overlapping regions; the second rubbing cloth having a width substantially corresponding to, the length of the rotary roller and a length corresponding to a second division of a circumference of the rotary roller; substantially all fibers of the second rubbing cloth extending away from the rotary roller and leaning towards a second end of the rotary roller; and
    the first direction and the second direction being on opposite sides with respect to a cross-section perpendicular to the length of the rotary roller.

14. The method of claim 13, wherein
    each of the substantially all fibers of the first rubbing cloth is inclined at a first inclined angle with respect to a first line perpendicular to a circumferential surface of the rotary roller and extending away from a first point where the each of the substantially all fibers of the first rubbing cloth is in contact with the circumferential surface, respectively;
    each of the substantially all fibers of the second rubbing cloth is inclined at a second inclined angle with respect to a second line perpendicular to the circumferential surface and extending away from a second point where the each of the substantially all fibers of the second rubbing cloth is in contact with the circumferential surface, respectively; and
    the first inclined angle and the second inclined angle are in the range of approximately 1 degree to approximately 20 degree.

15. The method of claim 14, wherein the first inclined angle is substantially the same as the second inclined angle.

16. The method of claim 13, wherein the first rubbing cloth and the second rubbing cloth are cut from a same rubber cloth.

17. A rubbing method for rubbing an alignment layer of a liquid crystal display substrate, comprising:
    loading a liquid crystal display substrate having an alignment layer on a rubbing station; and
    rubbing a surface of the alignment layer for a plurality of rubbing cycles by rotating a single rubbing roller comprising a rotary roll and a rubbing cloth substantially surrounding a circumferential surface of the rotary roller, each rubbing cycle comprising at least two distinct rubbing periods, and the rubbing cloth comprising at least a first portion and a second portion;
    wherein the at least two distinct rubbing periods comprises a first period in which the alignment layer is rubbed by the first portion having substantially all fibers extending away from the rotary roller and leaning towards a first end of the rotary roller, and a second period in which the alignment layer is rubbed by the second portion having substantially all fibers extending away from the rotary roller and leaning towards a second end of the rotary roller; the second period being later in time than the first period.

18. The method of claim 17, wherein each of the substantially all fibers of the first portion is inclined at a first inclined angle with respect to a first line perpendicular to a circumferential surface of the rotary roller and extending away from a first point where the each of the substantially all fibers of the first portion is in contact with the circumferential surface, respectively, each of the substantially all fibers of the second portion is inclined at a second inclined angle with respect to a second line perpendicular to the circumferential surface and extending away from a second point where the each of the substantially all fibers of the second portion is in contact with the circumferential surface, respectively, the first inclined angle and the second inclined angle are in the range of approximately 1 degree to approximately 20 degree.

19. The method of claim 18, wherein the first inclined angle is substantially the same as the second inclined angle.

20. The method of claim 17, further comprising providing the single rubbing roller; wherein the rubbing cloth comprises at least a first portion and a second portion, each having a width substantially corresponding to a length of the rotary roller and a length corresponding to a division of a circumference of the rotary roller; and substantially all fibers of the first portion extending away from the rotary roller and leaning towards a first end of the rotary roller, and substantially all fibers of the second portion extending away from the rotary roller and leaning towards a second end of the rotary roller.

\* \* \* \* \*